United States Patent [19]

Grubb

[11] 4,441,251

[45] Apr. 10, 1984

[54] METHOD AND APPARATUS FOR SERIALLY PRODUCING HARNESS ASSEMBLIES

[75] Inventor: Daniel B. Grubb, Hummelstown, Pa.

[73] Assignee: AMP Incorporated, Harrisburg, Pa.

[21] Appl. No.: 391,025

[22] Filed: Jun. 22, 1982

Related U.S. Application Data

[63] Continuation-in-part of Ser. No. 157,692, Jun. 9, 1980, abandoned.

[51] Int. Cl.³ ........................ H01P 43/04; B23R 23/00

[52] U.S. Cl. ...................................... 29/861; 29/566.3; 29/749; 29/866

[58] Field of Search ...................... 29/749, 566.3, 753, 29/754, 755, 757, 760, 857, 861, 866

[56] References Cited

U.S. PATENT DOCUMENTS

| | | | |
|---|---|---|---|
| 3,866,292 | 2/1975 | Tucci | 29/566.3 |
| 3,866,295 | 2/1975 | Tucci | 29/566.3 |
| 3,886,641 | 6/1975 | Davis | 29/749 X |
| 3,909,935 | 10/1975 | Aldridge et al. . | |
| 4,043,017 | 8/1977 | Folk et al. . | |
| 4,043,034 | 8/1977 | Sucheski et al. . | |
| 4,126,935 | 11/1978 | Rhines et al. | 29/857 |
| 4,136,440 | 1/1979 | Brandewie et al. . | |

*Primary Examiner*—Mark Rosenbaum
*Assistant Examiner*—Carl J. Arbes
*Attorney, Agent, or Firm*—F. W. Raring

[57] ABSTRACT

A method and apparatus are disclosed for manufacturing harness assemblies comprising two connectors having wires extending between the connectors. The two connectors are positioned adjacent to each other in an insertion zone with the wire receiving portions of terminals in the connectors in alignment. The wires are located in two spaced-apart planes in alignment with the terminals and the wires are moved towards the connectors and into the wire receiving portions of the terminals. Thereafter, the one connector with the wires attached is removed and the other connector is moved through and beyond the insertion zone and wires are pulled from reels and located in the insertion zone in the spaced-apart planes. The cycle is then repeated in placing two additional connectors in the insertion zone between the two planes of wires. A specific apparatus for carrying out the method is also disclosed.

21 Claims, 19 Drawing Figures

46
44
138'
168
157
158
152
156
178
172'
174
172
180
182
36
170
160
134
136
138
40
206
214
212
22
200
198
202
210
30
196
211
204
208
200

128
118
130
122
126
22
124
90
158
156
152
157
154'
10
154
4
153
2
6
70'
142'
190
222
142
70
154

METHOD AND APPARATUS FOR SERIALLY PRODUCING HARNESS ASSEMBLIES

This application is a continuation-in-part of application Ser. No. 157,692, filed June 9, 1980 now abandoned.

BACKGROUND OF THE INVENTION

1. The Field of the Invention

U.S. Pat. Nos. 3,866,297 and 3,909,935 disclose and claim methods and apparatus for connecting wires to the wire receiving portions of terminals in each of two electrical connectors. The connectors are placed in side by side relationship with their wire receiving portions in alignment and the wires are located in side by side relationship and in alignment with the connectors so that the wires can be inserted into the connectors in a single inserting step by a suitable insertion apparatus. The wires are cut between the two connectors and short segments of scrap wire are produced and discarded.

The above identified U.S. patents specifically disclose the insertion of wires into two identical connectors which can be mated with each other after the insertion operations have been carried out. However, as explained in the specifications of these prior patents, the principles of the inventions can be used with other types of connectors.

The methods and apparatus of U.S. Pat. Nos. 3,866,297 and 3,909,935 offer several advantages which are capable of facilitating the manufacturing of harness assemblies by automated methods. However, the insertion tooling disclosed in these patents requires a substantial number of manual operations which limit the speed with which the operations can be carried out. The present invention is directed to improved methods and apparatus in accordance with the general principles of the above identified patents which improved methods reduce the number of manual operations required and therefore permit more rapid production of harness assemblies.

The above identified patents show the connection of wires to connectors having only a single row of terminals therein and it would further be desirable to employ the teachings of these patents in connecting wires to connectors having two rows of terminals therein. The present invention is further directed to the achievement of methods and apparatus for connecting wires to two row connectors.

In accordance with the principles of the present invention, the wires are drawn from substantially endless sources of wires such as barrels or spools and are located in two spaced apart planes with the wires in each plane spaced from each other by distances which are the same as the distances between adjacent terminals in the connectors. First and second connectors are then located in side by side relationship between the two planes of wires with the wires in each plane in alignment with the terminals in the connectors. Thereafter, the wires in both planes are moved laterally of their axes and into the wire receiving portions of the terminals in both connectors. The short segments of wire which extend between the two connectors are cut and discarded as scrap. The second connector, which is relatively remote from the sources of wire, is then removed and the first connector, which is proximate to the sources of wire, is then advanced or fed through the insertion zone and away from the wire sources so that the wire is withdrawn from the wire sources. After the first connector has been fed the desired distance, two additional connectors are then located in the insertion zone and in alignment with the wires as explained above. The entire process is then repeated so that a single finished harness sub-assembly is produced during an operating cycle.

Harness sub-assemblies as described above can be produced with a wide variety of apparatus having varying degrees of automaticity in their operation, such as the operations of feeding of the connectors to the insertion zone, feeding of the wired connectors from the insertion zone, and insertion of the wires into the conductor receiving portions of the terminals in the connectors. In accordance with the principles of the present invention, connector feeding or loading means are provided for locating unwired connectors in the insertion zone between the wires in the spaced apart planes. A semi-automatic connector feeding means is also employed to feed wired connectors through the insertion zone when the wires are drawn from the barrels or reels. The individual wires are inserted into the wire receiving portions of the terminals and the wires are cut by means of suitable wire insertion tooling and severing blades mounted on a press.

BRIEF DESCRIPTION OF THE ACCOMPANYING DRAWINGS

FIG. 8 is a view, taken along the lines 8—8 of FIG. 7.

FIG. 17 is a diagramatic view of an alternative form of electrical harness.

DETAILED DESCRIPTION OF THE PREFERRED EMBODIMENTS

Figure 1:
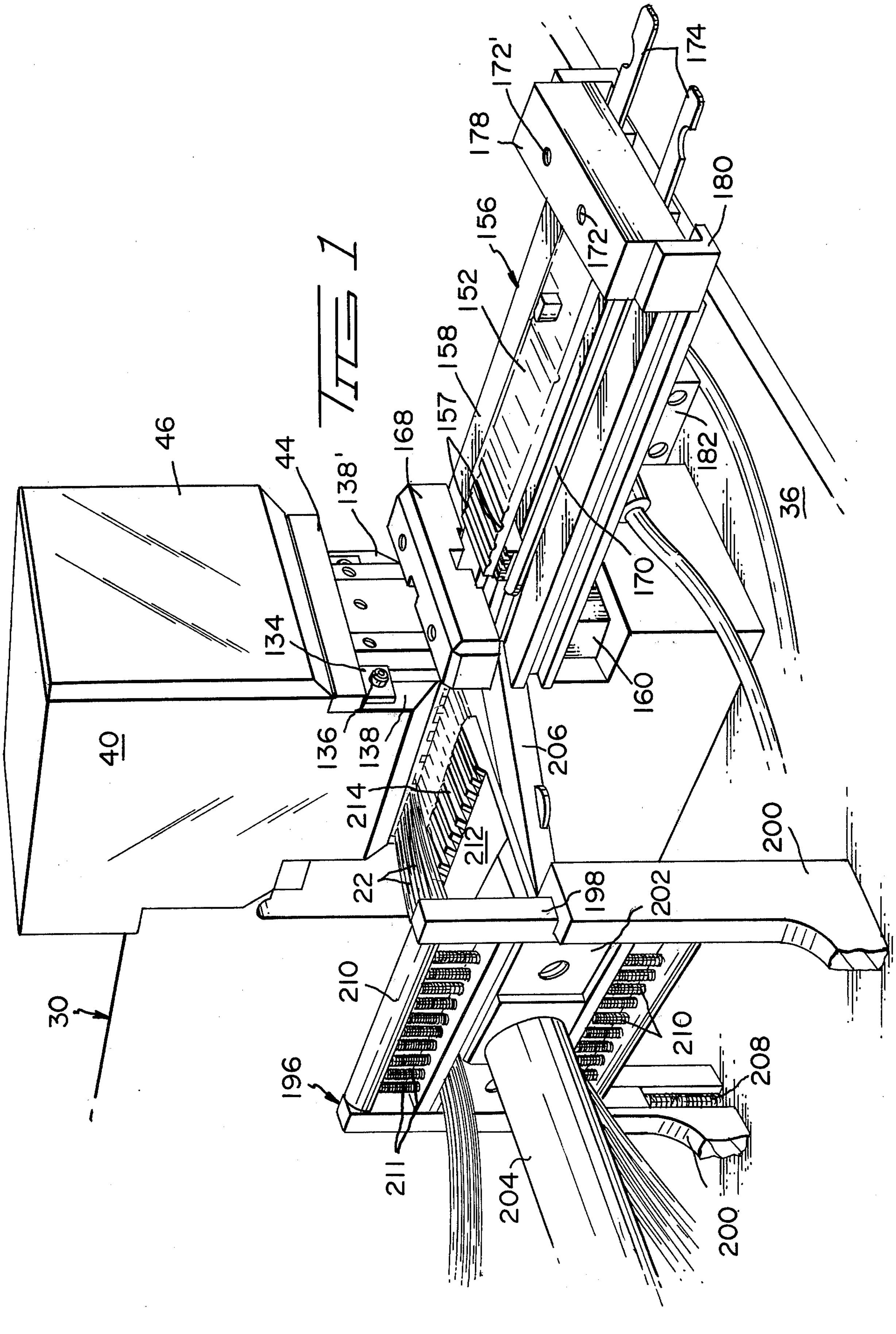
FIG. 1 is a perspective view showing portions of a bench press having harness making apparatus in accordance with the invetion mounted on the press ram and showing also the connector feeding means for feeding connectors into the insertion zone of the apparatus.
Figure 2:
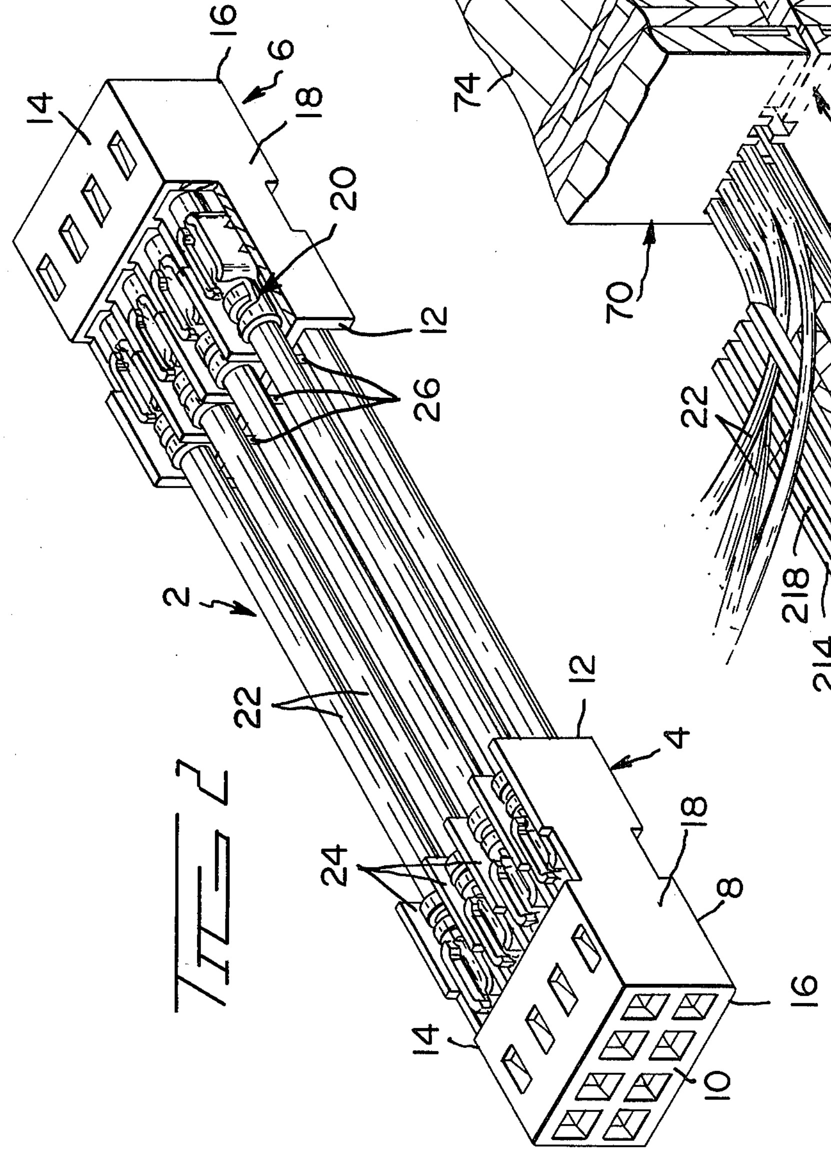
FIG. 2 is a perspective view showing a relatively simple harness sub-assembly produced by the practice of the invention.

Harness assemblies as shown at 2, FIG. 2, are produced by the practice of the invention by the method shown in FIGS. 3-6. The harness 2 will first be described in detail and the method of producing this harness will then be described with reference to FIGS. 3-6 in order to facilitate the description of the embodiment of the invention shown in FIG. 1.

The harness assembly 2 comprises first and second connectors 4, 6 which are identical to each other. Each connector comprises an insulating housing 8 having a mating end 10, a rearward end 12, top and bottom sidewalls, as viewed in the drawing, 14, 16 and laterally facing endwalls 18. Each housing contains a plurality of contact terminals and each terminal has a relatively elongated wire receiving rearward end 20 which is connected to a wire 22. The wire receiving rearward end portions of the terminals are of the type which receive wires upon movement of the wires into the wire receiving portions and establish contact with the conducting cores of the wires. The particular connectors 4, 6 shown are of the type fully described in U.S. Pat. No. 4,243,288. However, it will be understood that the invention can be practiced with a wide variety of types of connectors.

The contact terminals in the connector housings 8 are arranged in two parallel rows 24, 26, each row opening onto one of the sidewalls 14, 16. It will thus be apparent that the wires 22 can be connected to the terminals by locating these wires in alignment with the terminals, with the housing between the wires, and moving the wires towards the sidewalls 14, 16.

FIGS. 3-6 illustrate the steps carried out in the serial production of harness assemblies 2 and show some of the essential parts of the appartus used in the practice of the invention. At the beginning of the operating cycle, the wires will extend from spools or reels through an insertion zone generally indicated at 222 with the wires arranged in parallel spaced apart planes. The leading ends of the wires will have a connector 4 installed thereon to which the wires were connected during the previous operating cycle of the apparatus.

The insertion zone 222 has first and second insertion stations 224, 224′ which are between a press ram described below and the lower arm of the press.

Figure 4:
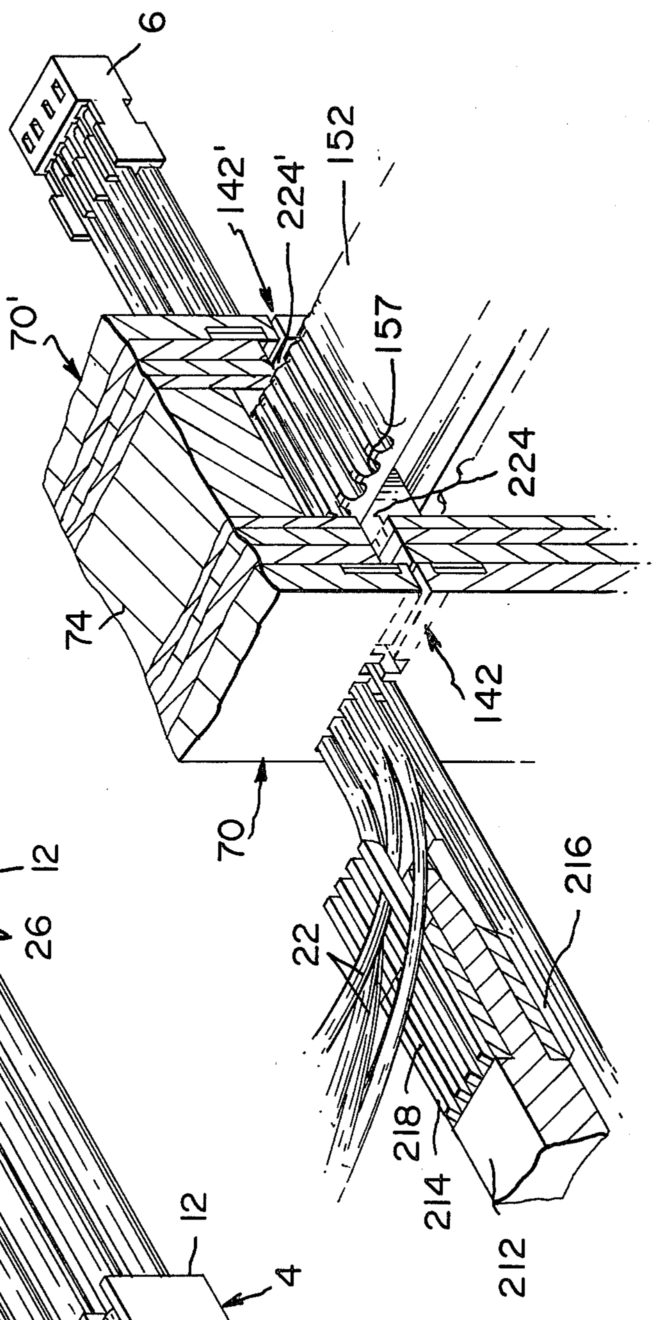
FIGS. 3–6 are a series of fragmentary views showing the insertion zone of the appartus and features of the essential mechanism in the apparatus, these views illustrating the successive steps in the serial production of harness assemblies.
Figure 3:
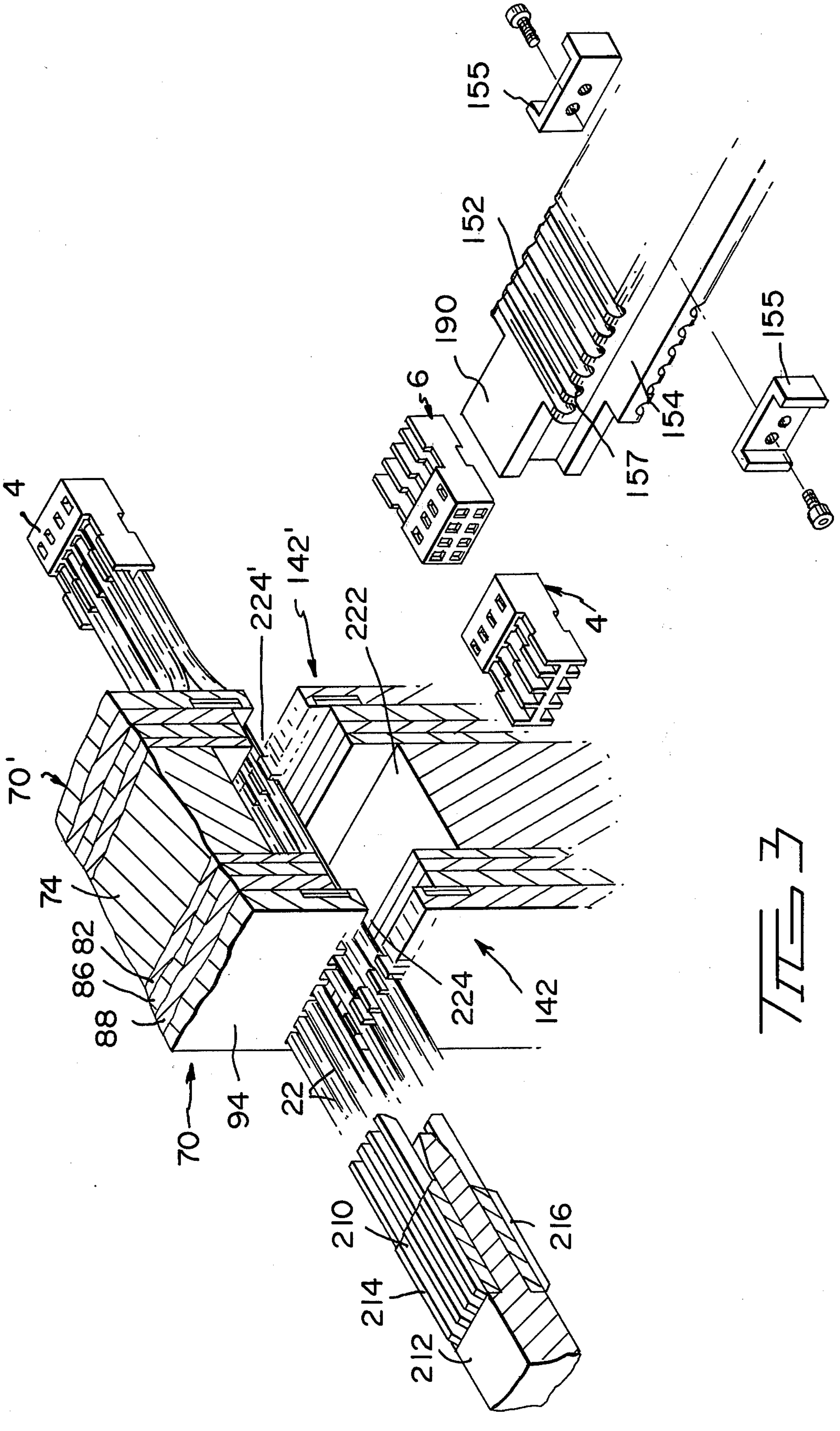
Figure 6:
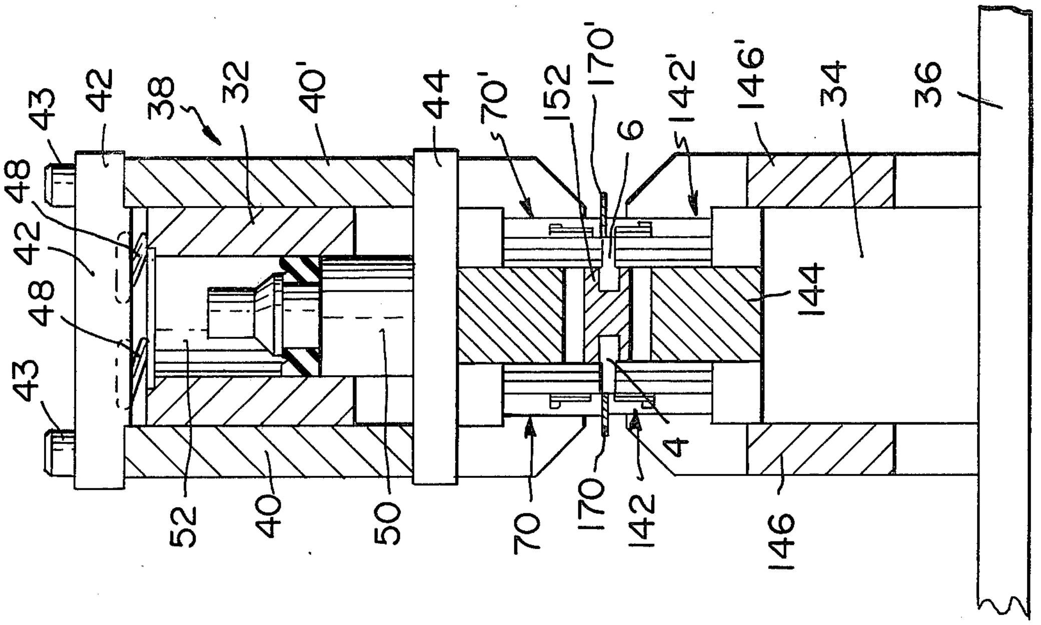
Figure 5:
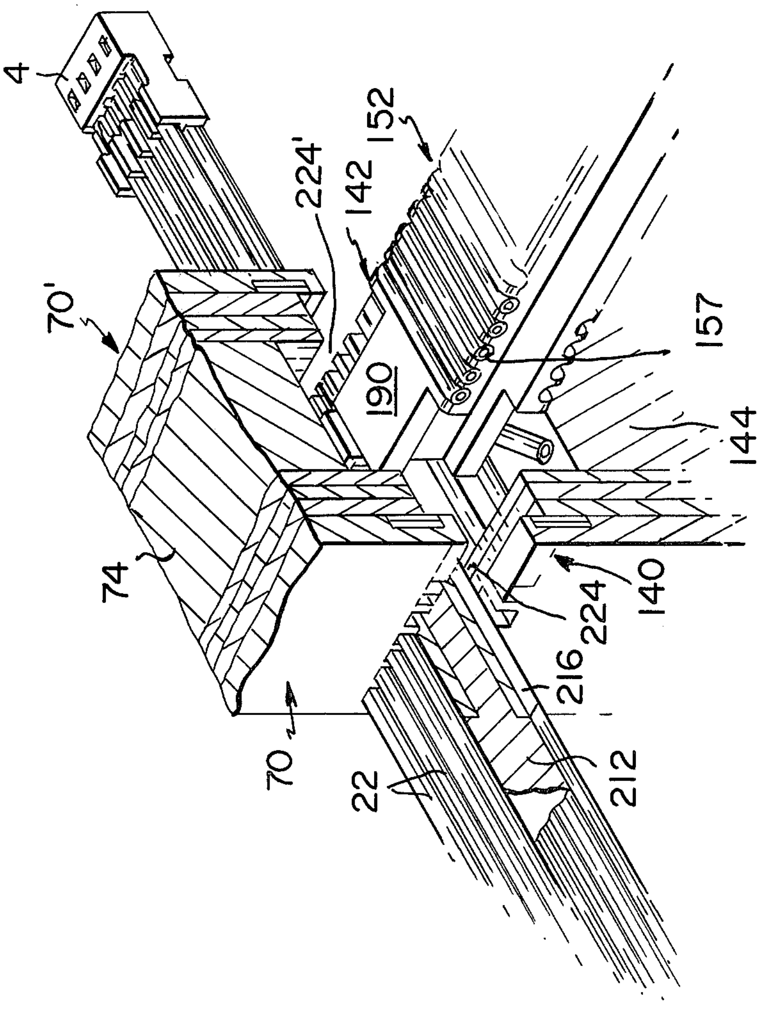

A first connector 4 is positioned in the first insertion station 224 and a second connector 6 is positioned in the second connector station 224′. The connectors are located between the two parallel planes in which the wires extend with the wire receiving portions of the terminals in the connectors 4 and 6 in alignment with each other and in alignment with the wires. Insertion tooling described below is then brought into engagement with the wires as shown in FIG. 4 and each wire is cut at two locations so as to remove scrap segments of wire which extend between the first and second connectors 4, 6. The insertion tooling is then disengaged from the connectors, FIG. 5 and a completed harness assembly 2 is removed as shown in FIG. 6. The first connector 4 is advanced through the insertion zone 222 until the desired amount of wire has been drawn from the wire spools. During movement of the first connector 4 through the insertion zone, the wires 22 are maintained in the two spaced apart planes so that during the next cycle, a first and second connector 4, 6 can be located between these planes. It will be apparent that each harness assembly 2 thus consists of one first connector 6 on the left-hand end thereof, and one second connector 4 on the right-hand ends of the wires. It will be apparent that two operating cycles are required to manufacture a single harness assembly although one harness assembly is produced during each cycle.

Turning now to FIGS. 1 and 7-9, the disclosed form of apparatus for the practice of the invention comprises a C-shaped press frame 30 having upper and lower arms 32, 34 extending from the neck portion thereof. The frame is mounted on a suitable base plate 36 which in turn may be supported on a bench or the like.

A ram assembly generally indicated at 38 is mounted on the upper arm 32 and is movable towards and away from the lower arm. Ram assembly 38 comprises side plates 40, 40′ which are disposed against the side surface of arm 32, see FIG. 8, and braces 42 which extend across the upper surface of this arm and are bolted to the side plates by fasteners 43. A tooling support plate 44 is bolted to the lower edges of the side plates 40, 40′ beneath the arm 32 and springs 48 are interposed between the upper surface of the press frame arm 32 and the downwardly facing surfaces of the transverse frame or brace members 42. These springs bias the ram assembly 38 upwardly and the ram assembly is lowered by a hydraulic piston 50.

Figure 7:
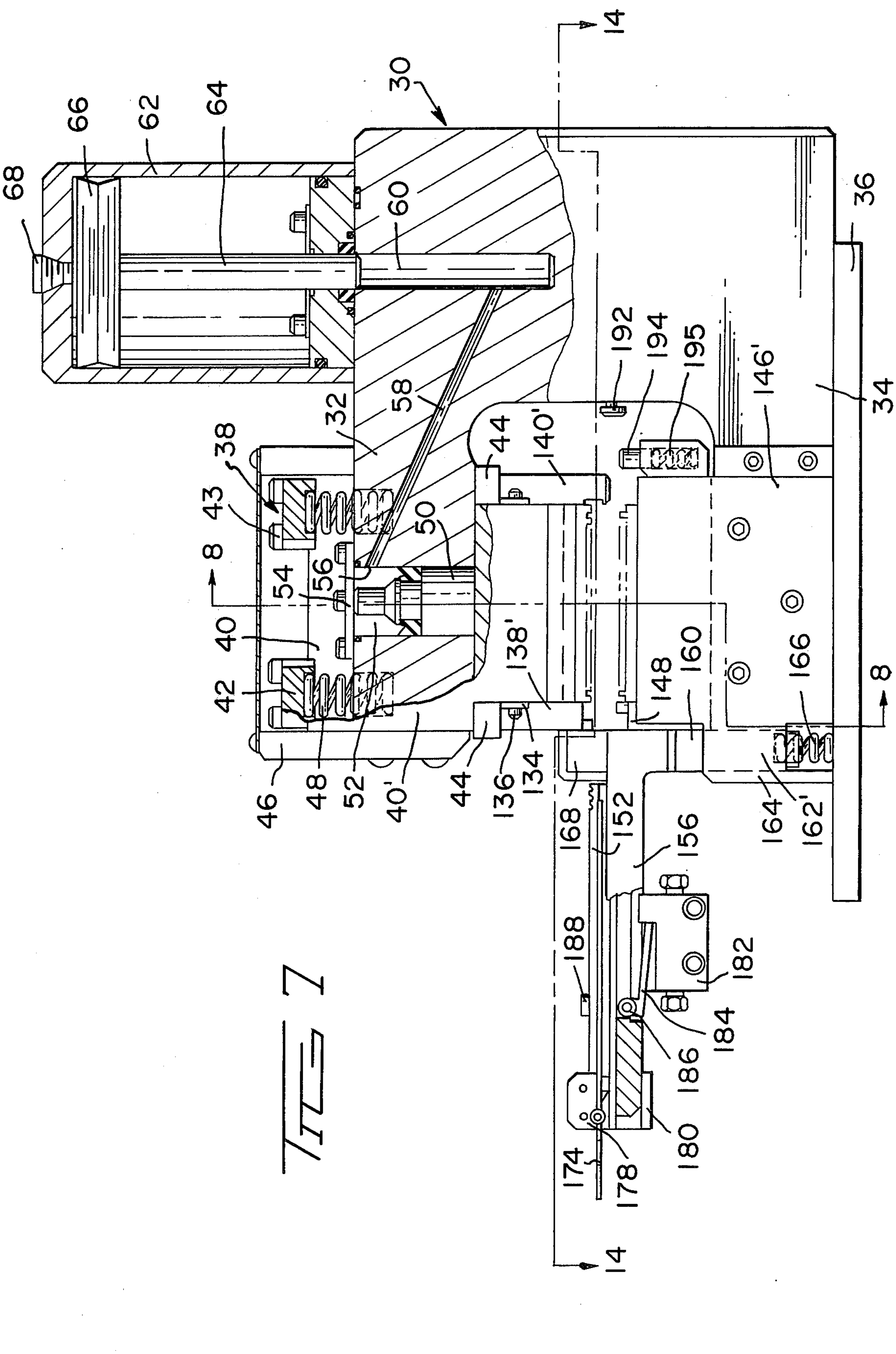
FIG. 7 is a side view looking from the right in FIG. 1, with parts broken away, of the apparatus.

The piston is contained in a cylinder 52 which is drilled into the upper arm 32 and is closed by a cylinder head 54, see FIG. 7. The piston 50 is secured to the tooling support plate 44 and is moved downwardly from the position of FIG. 7 when hydraulic fluid is introduced into the cylinder through a port 56 at the end of a passageway 58. The passageway 58 extends through the press frame to a reservoir 60 that extends to the upper surface of the press frame. A pneumatic cylinder 62 is mounted on the press frame and has a piston 66 therein and a piston rod 64 which is dimensioned to enter the reservoir 60. When compressed air is admitted through inlet 68 to the cylinder 62, the piston 66 is driven downwardly so that piston rod 64 moves into reservoir 60. Hydraulic fluid under pressure is then forces into cylinder 52 driving the piston 50 and the tooling support plate 44 downwardly. The springs 48 return the ram assembly to its normal position when the pressure in the cylinder 52 is relieved.

Figure 11:
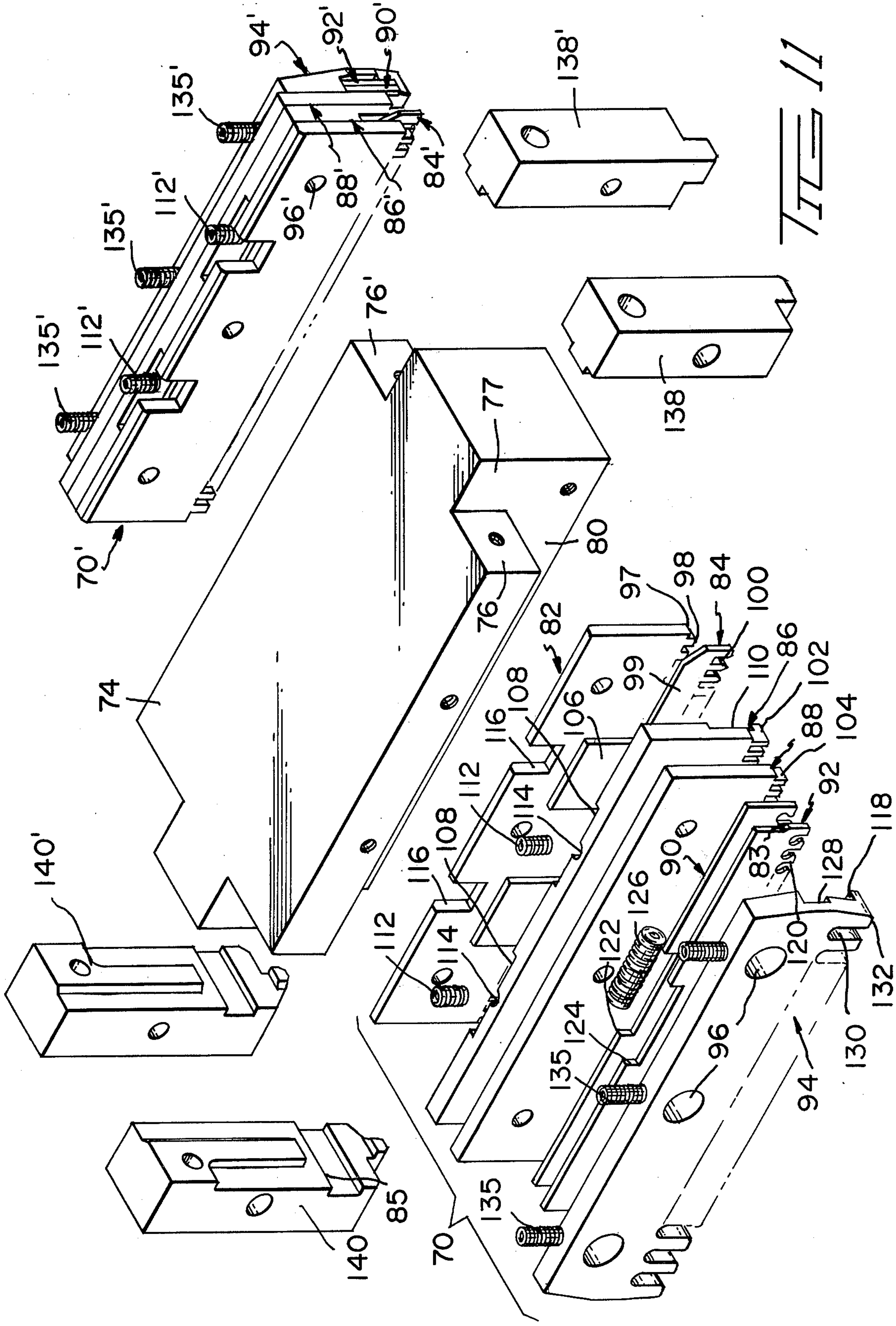
FIG. 11 is a perspective view of the upper insertion tooling of the apparatus and showing a tool support block on which the tooling is mounted.

FIG. 11 shows at 70 and 70′, the upper insertion tooling for the first and second insertion stations. The tooling shown at 70 and 70′ serves to insert the wires into the upper rows of terminals in each of the first and second connectors and lower tooling, described below, simultaneously inserts the wires beneath the connectors 4, 6 into the terminals in the lower row 26 of each connector. The tooling 70′ of the second insertion station 224′ is identical to the tooling 70 for the first insertion station 224 and a description of the tooling 70 will therefore suffice for both sets of upper tooling.

The upper insertion tooling 70 comprises a plate-like wire shearing member 82, a wire separator 84, inserters 86, 88, wire retaining plates 90, 92 and a wire positioning plate or comb 94. These tooling members are essentially plate-like devices of varying thickness and are nested or stacked against each other as shown in FIG. 11. The stack of plate-like tooling members is in turn mounted against a side surface 80 of a tooling mounting block 74 which has outwardly or laterally extending flanges 76, 76' that overhang the tooling plates. The tool mounting block 74 is held on the lower end of the ram assembly 38 and against the underside of the tooling support plate 44 by the inwardly directed lower ends 78, 78' of the side plates 40, 40', see FIGS. 9 and 10. The stacks 70, 70' of tooling members are held in their proper positions by retaining plates 134 which are secured by screws 136 to the edges of the side plates 40, 40' and which extend over the side edges of the tooling stacks, see FIG. 7. The plate-like tooling members are secured to the mounting block 74 by fasteners 72, see FIG. 9, which extend through aligned openings 96 in the shearing member 82, the inserters 86, 88 and in the wire positioning plate 94. The wire positioning plate 94 is resiliently mounted on the mounting block to permit overtravel for reasons discussed below.

The wire shearing plate 82 has spaced-apart teeth 98 extending from its lower edge, and the edges 97 which are between these teeth function as movable shearing edges in cooperation with fixed shearing edges 157 of a slide 152. The wire separator plate 84 comprises a relatively narrow bar 99 having notches extending upwardly from its lower edge to define spaced-apart teeth 100 between which the wires are located. The inserters 86, 88 have similar teeth 102, 104 which insert the wires 22 into the terminals adjacent to the rearward ends 20 of the terminals.

Shearing plate 82 is inmovably mounted against surface 80 while the wire separator 84 is slidably contained for limited vertical movement in a groove 110 that extends across the adjacent face of inserter 86. Vertically extending recesses 108 are also provided in inserter 86 and receive vertically extending guides 106 which are integral with the wire separator 84. The wire separator 84 is biased downwardly to the limit of its movement in the groove 110 by means of springs 112 which bear against the upper edge of the plate 84 and against the inner end of a recess in the underside of the flange 76 of the tool mounting block 74, see FIG. 4. It is necessary to provide clearance for these helical springs in the shearing plate as shown at 116 and in the inserters as shown at 114, the latter being a clearance channel centrally located in the recess 108. This arrangement permits overtravel of the shearing plate 82 relative to the separator 84 when the wires are sheared.

The wire positioning plate or comb 94 has notches 130 extending upwardly from its lower edge 132. These notches have a width which is greater than the diameter of the wires 22. The notches 130 are in alignment with notches 122, 124 in the retainer plates 90, 92 and the retainer plates are carried by the positioning plate as described immediately below.

Figures 6, 13, 16:
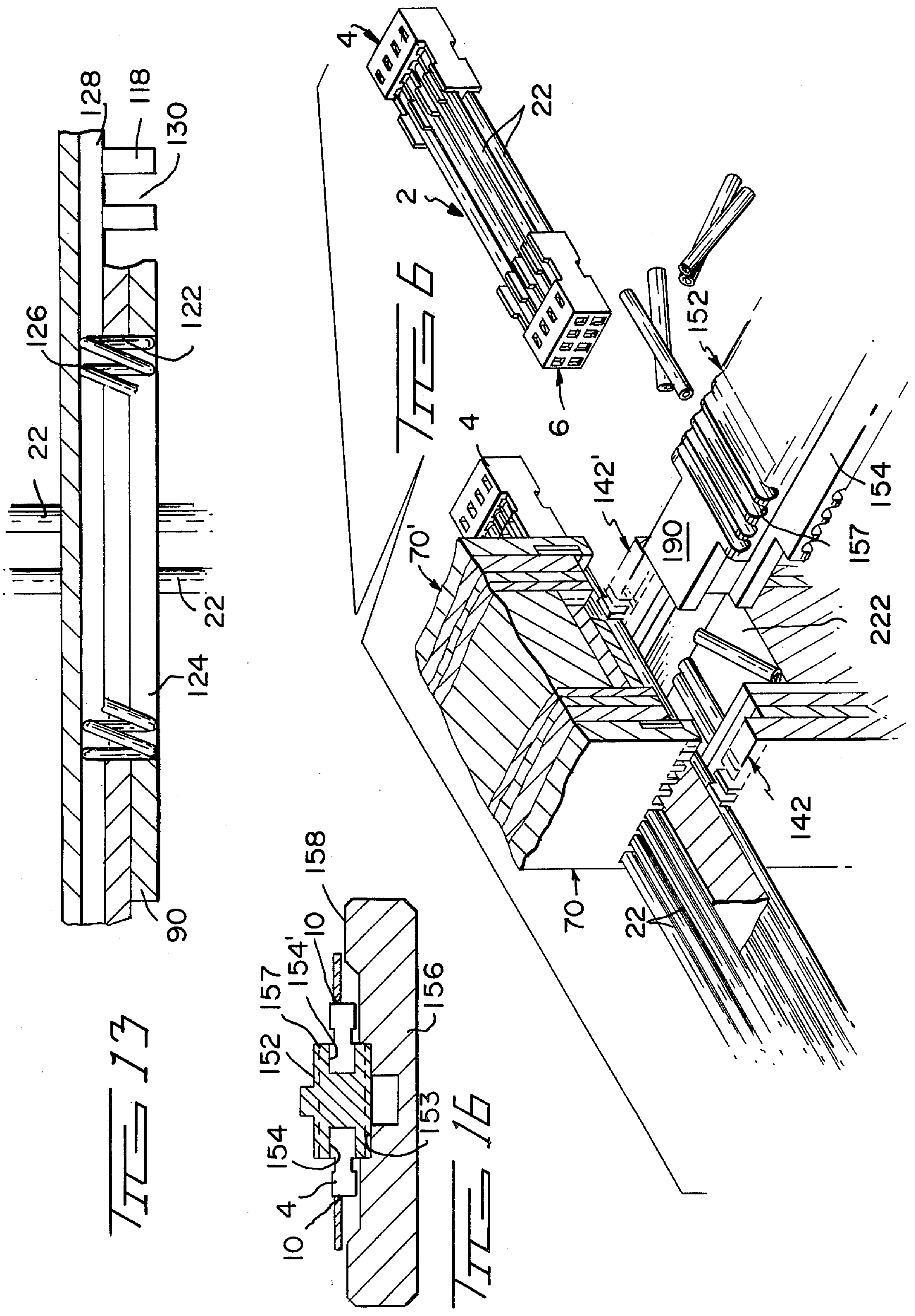
FIG. 13 is a view taken along the lines 13—13 of FIG. 12.
FIG. 16 is a view taken along the lines 16—16 of FIG. 14.

The retainer plates 90, 92 cooperate with each other to provide a releasable retaining means for the wires prior to movement of the wires into the terminals in the connectors. These retainer plates are positioned against each other and held in a channel like recess 118 in the side face 120 of the wire positioning plate or comb 94. The retainer plates 90, 92 have notches 122, 124 extending inwardly from their upper edges and a helical spring 126 is positioned in these notches as shown in FIG. 13. As also shown in FIG. 13, the notches 122, 124 are offset from each other so that the spring 126 biases plate 92 rightwardly and biases plate 90 leftwardly as viewed in FIG. 13. The plates however can be moved in directions opposite to their bias with accompanying compression of the spring 126. The spring 126 requires clearance in the face 120 of the wire positioning plate 94 and the recess 118 has a deepened portion 128 at its upper end for this purpose.

Figure 12:
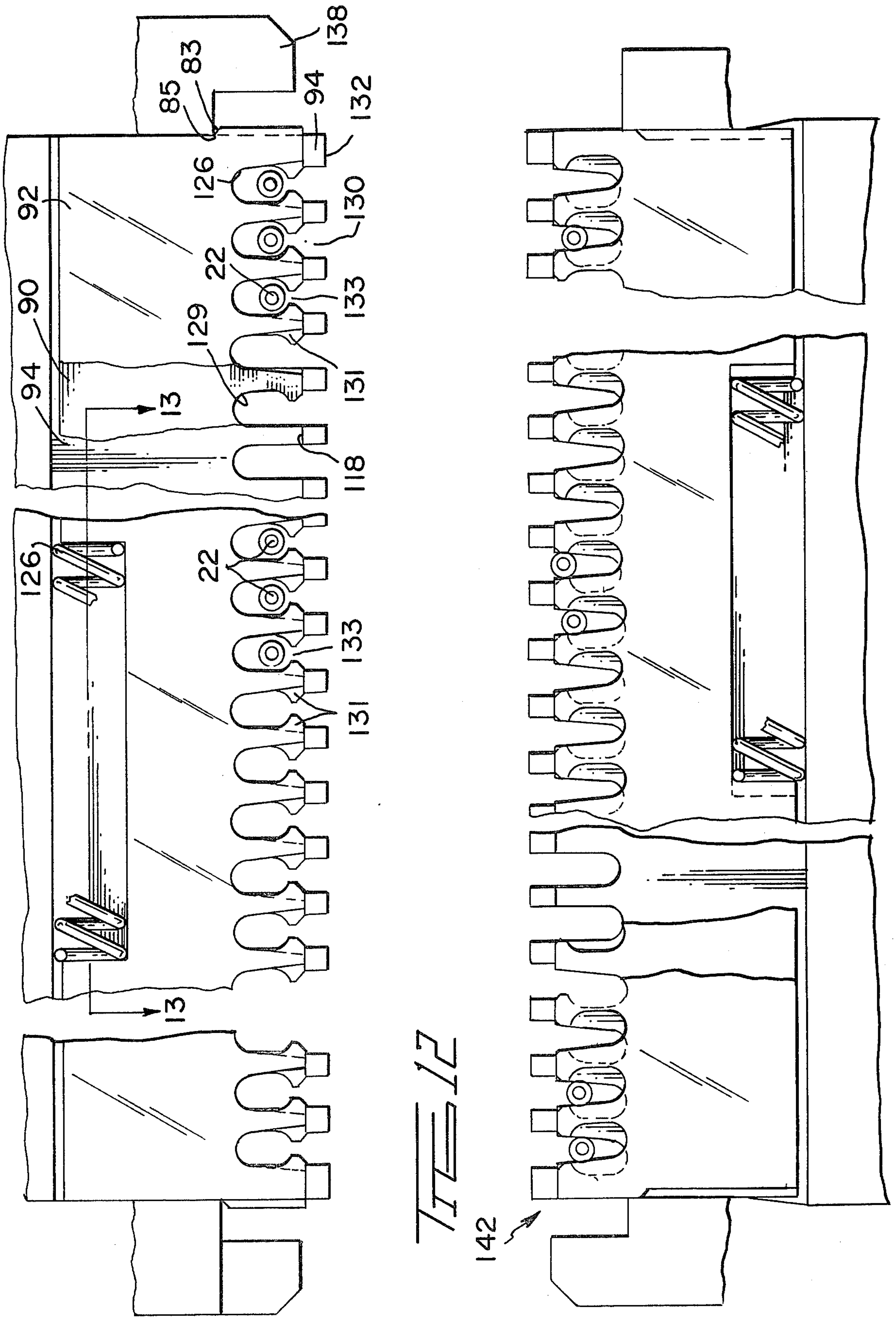
FIG. 12 is a fragmentary view taken along the lines 12—12 of FIG. 9 and showing details of the wire retaining means of the upper and lower tooling.

As best shown in FIG. 12, wire receiving notches 127, 129 extend upwardly from the lower edges of the plates 90. 92. The plate 90 has laterally extending retaining ears 131 which extend rightwardly at the entrance to each of its notches 127 while the plate 92 has leftwardly extending retaining ears 131 at the entrance to each of its notches. These retaining ears 131 on plates 90, 92 thus form constricted entrances 133 to the notches of the plates, the width of these entrances being somewhat less than the diameter of the wires 22. However, the wires can be pushed out of the notches when the entrances 133 to these notches are enlarged by moving the wire retainer plates 90, 92 in opposite directions such that the inwardly turned ears 131 move away from each other, see FIGS. 12A and 12B. The plates 90, 92 are caused to be so moved by camming surfaces on the aligning blocks 138, 140 which are described below.

The wire positioning plate 94 has the retaining plates 90, 92 carried in the recess 118 and the positioning plate 92 and the retainer plates thereby constitute a subassembly portion of the tooling assembly 70. This entire subassembly is moveable in a vertical direction relative to the remaining elements, the remaining elements being the shearing plate 80, the separator 84, and the inserters 86, 88. Note that the openings 96 in the plate 94 are oversized (see FIG. 9) to permit this relative movement. The positioning plate 94 is resiliently biased by helical springs 135 to the position shown in FIG. 9 and the plate 94 can be moved relatively upwardly from this position. Such upward movement takes place when the tooling is moved downwardly.

Figure 12A:
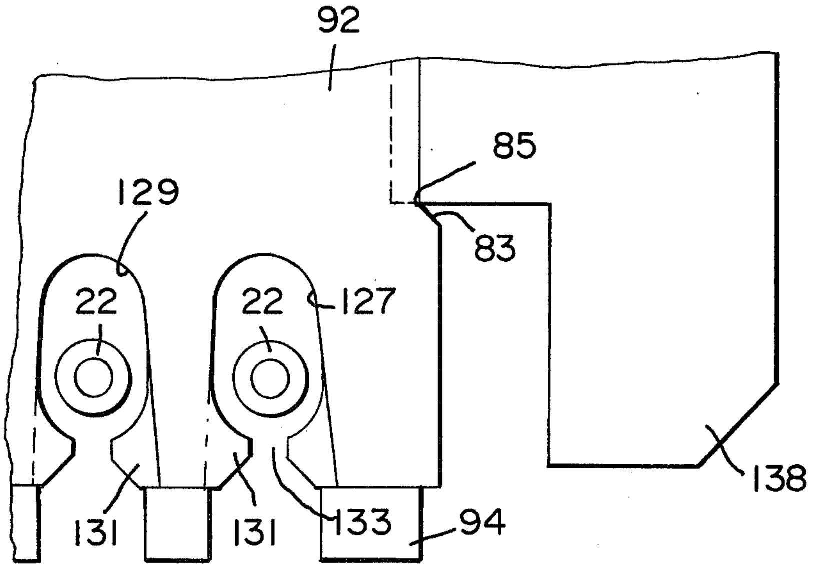
FIG. 12A is an enlarged fragmentary view showing a portion of the wire retainer plates of the upper tooling and an adjacent aligning block, this view showing the positions of the parts when the wire retainer slots are in the closed positions.
Figure 12B:
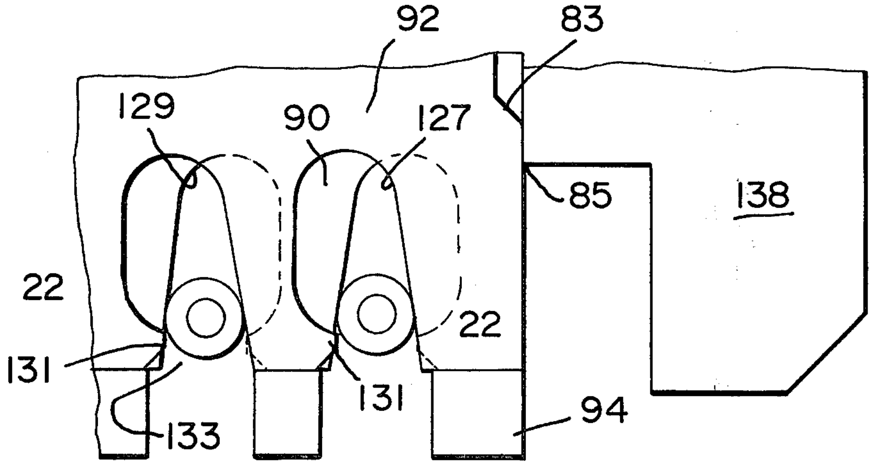
FIG. 12B is a view similar to FIG. 12A but showing the positions of the parts when the entrances to the wire retaining slots are enlarged.

As mentioned above, the wire retainer plates 90, 92 can be moved in opposite directions with accompanying compression of the spring 126 thereby to open up the entrances 133 to the wire receiving notches 127, 129, see FIGS. 12A and 12B. The leftward movement of the plate 92 from the positions of FIG. 12A to the position of 12B is accomplished by inclined camming surfaces 83 on the side edge of the plate. This camming surface 83 is engaged by a corner 85 of aligning block 138. The aligning block 138 is secured against surfaces 76, 77 of the mounting block 74 and a similar aligning block 140 is secured to the block 74 on the left-hand end thereof as viewed in FIG. 11. The plate 90 also has a camming surface similar to the camming surface 83 which is engaged by a corner of the aligning block 140 so that the plate 90 is moved rightwardly from the position of FIG. 12A while the plate 92 is moved leftwardly.

When the ram assembly 38 moves downwardly from the position of FIG. 9, the wires 22 are initially carried downwardly and are retained by the constricted entrances 133 of the wire retaining notches, but when the plate 94 moves against a connector retainer 170 (which is described below) the sub-assembly comprising the plates 94, 92 and 90 is stopped from further downward movement. Thereafter the mounting block 74 continues to move downwardly and the aligning blocks 138, 140 move downwardly relative to the plates 90, 92. During this stage of the downward stroke of the ram assembly 38, the plates 90, 92 are cammed in opposite horizontal directions from the positions of FIGS. 12A to the positions of FIG. 12B thereby enlarging the entrances 133 to the notches in which the wires are disposed. The wires 22 are then free to move downwardly towards the connector 4. The plates 90', 92' are similarly cammed open by the aligning blocks 138', 140'.

The aligning blocks 138, 140, 138', 140' perform several functions. In addition to the camming function discussed above, these aligning blocks hold the stacks 70, 70' in properly aligned positions on the support block 74. The aligning blocks also function as positioning means for a slide member 152 which is discussed below.

The lower first and second insertion tooling assemblies 142, 142' are substantially similar to their counterparts 70, 70' and need not be described in detail. These tooling assemblies are mounted on a lower tooling mounting block 144 which is similar to the mounting block 74 and which is in turn supported on the lower arm 34 of the press frame. As shown in FIG. 9, side plates 146, 146' are provided for the lower tooling assemblies which serve the same function as the side plates 40, 40' although the lower side plates 146 and 146' are fixed in position. Lower front aligning blocks 148, 148' are also provided for aligning and guiding purposes, see FIGS. 7 and 14. The rear aligning blocks 140, 140' project downwardly to the extent that they also function as lower rear aligning blocks.

Figure 14:
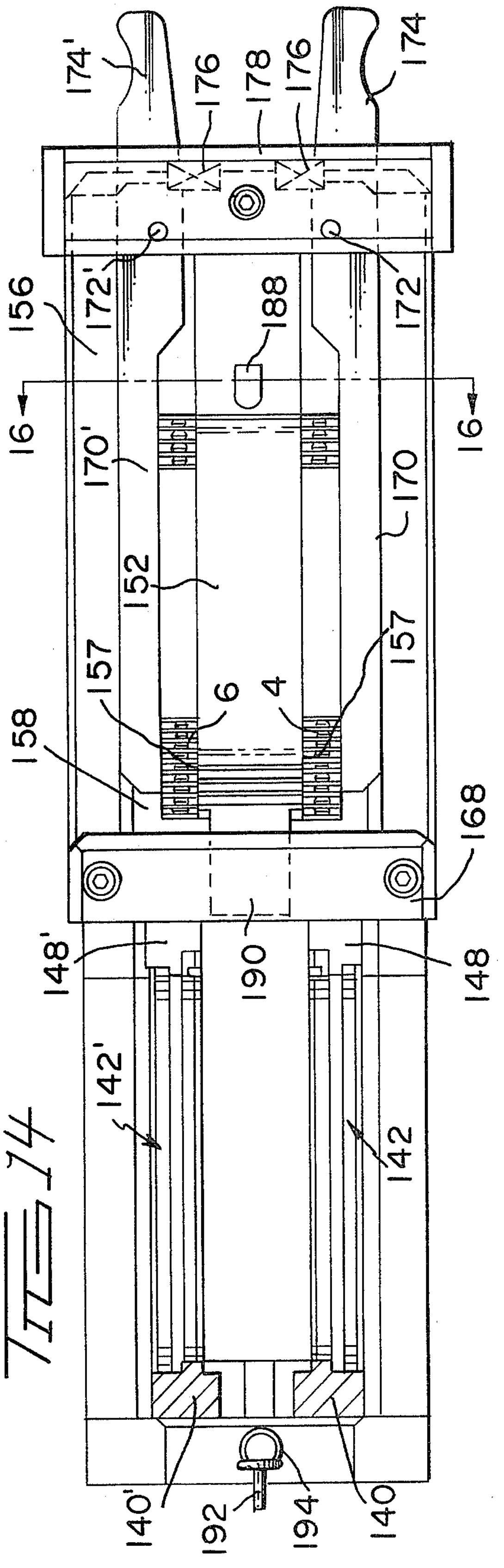
FIG. 14 is a plan view taken along the lines 14—14 of FIG. 7 and showing the loading slide for loading connectors in the insertion zone, this view showing the slide in its retracted position.
Figure 15:
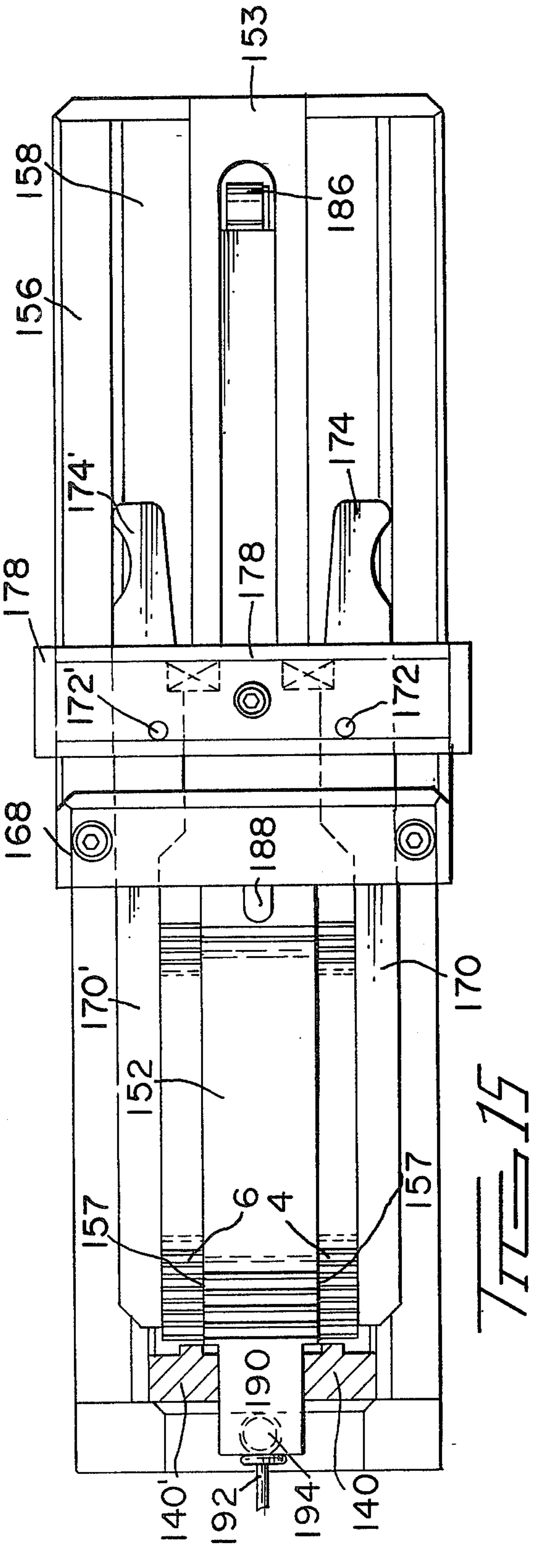
FIG. 15 is a view similar to FIG. 14 but showing the slide in its inner position.
Figure 11:
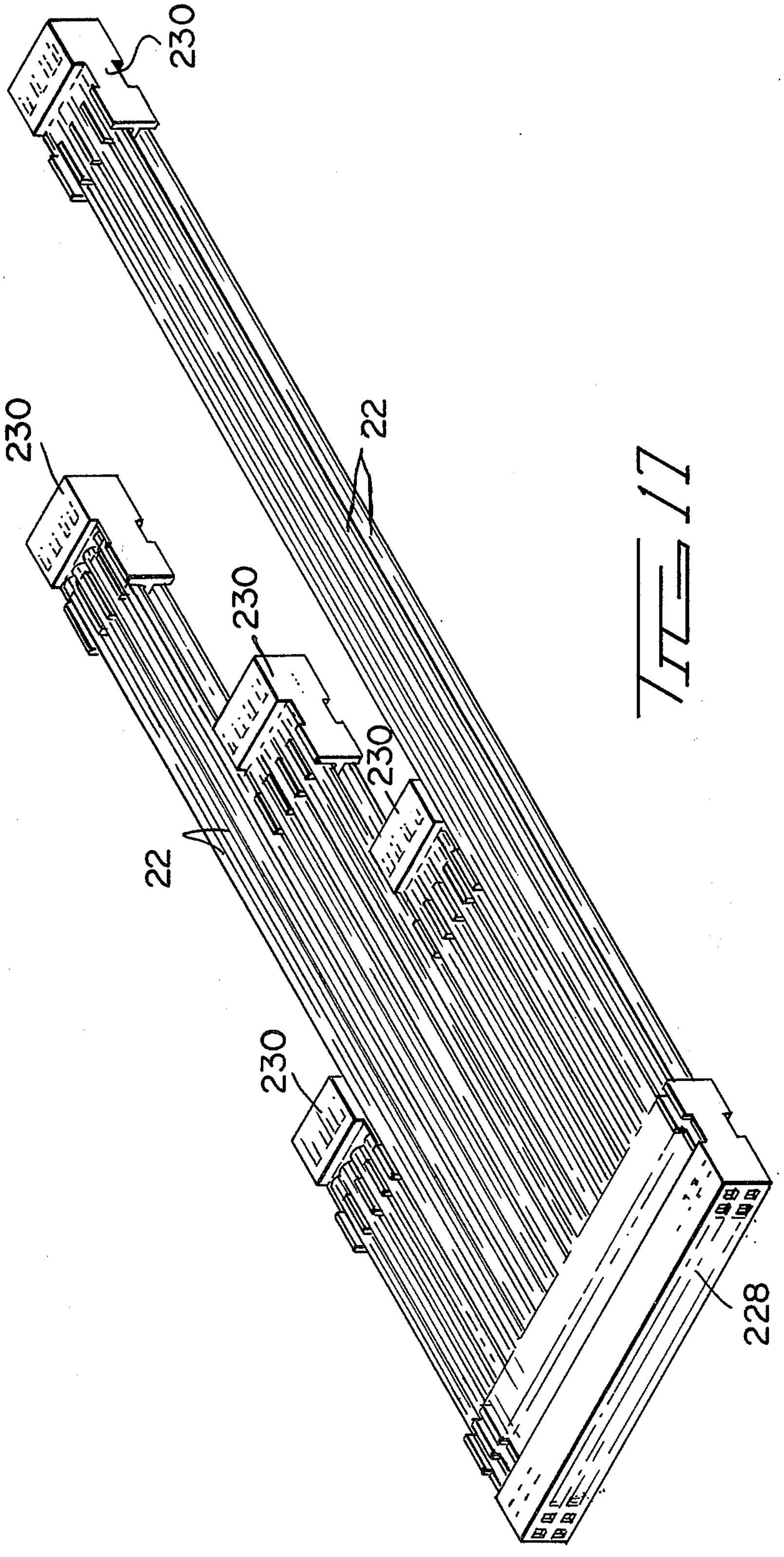

The first and second connectors 4, 6 are positioned in the operating zone and located between the upper and lower tooling assemblies by means of a slide generally indicated at 152, FIG. 14 and movable from a loading position as shown in FIG. 14 to a locating position shown in FIG. 15 in which it locates the connectors in the insertion zone.

The slide 152 has connector receiving slots 154, 154' in its sides which receive the first and second connectors as shown in FIG. 16. The mating ends of the connectors are positioned in the slots so that a portion of each connector housing adjacent to the mating end is received in the slot and the rearward portion of the connector extends laterally from the slot so that the wires can be inserted into the terminals in each of the rows of terminals. The connectors 4, 6 must be precisely located in the slots 154, 154' so that they will be in alignment with the wires 22 in the insertion zone when the slide member is moved inwardly to the position shown in FIG. 15. In the disclosed embodiment, precise location of the connectors is achieved by means of stops 155 shown in FIG. 3 which are secured by fasteners in the channels or slots 154, 154'. When the slide member is moved from its retracted position to its inner position, FIG. 15, the leading end of the slide will move beyond the aligning blocks 140, 140' and the lower ends of these aligning blocks act as additional stops for the connectors. Thus, the connectors are located when the slide is in its inner position between the lower ends of the rear aligning blocks 140, 140' and the stops 155 which are secured in the slots 154, 154'.

The slide 152 is slidably supported in recess 153 in the upper surface 158 of a slide support 156 which extends laterally from the insertion zone, see FIGS. 7 and 16. The slide support has a depending flange 160 at its inner end adjacent to the insertion zone, see FIG. 7, which extends downwardly and is contained between ears 162, 162' which extend from the lower side plates 146, 146'. Flange 160 is slidably contained between these ears by a front cover plate 164 and springs as shown at 166 are located between the lower end of the flange 160 of the base plate 36. The slide support 156 can thus be moved downwardly while the wires are being inserted into terminals and the connectors on the slide will thereby be moved downwardly toward the lower tooing assembly. A guide 168 (FIGS. 7 and 14) is mounted on the upper surface 158 of the slide support for guiding the slide into the insertion zone. When the ram assembly 38 is moved downwardly, this guide is engaged by the tooling support plate 44 causing such downward movement of the slide support 156.

Figure 9:
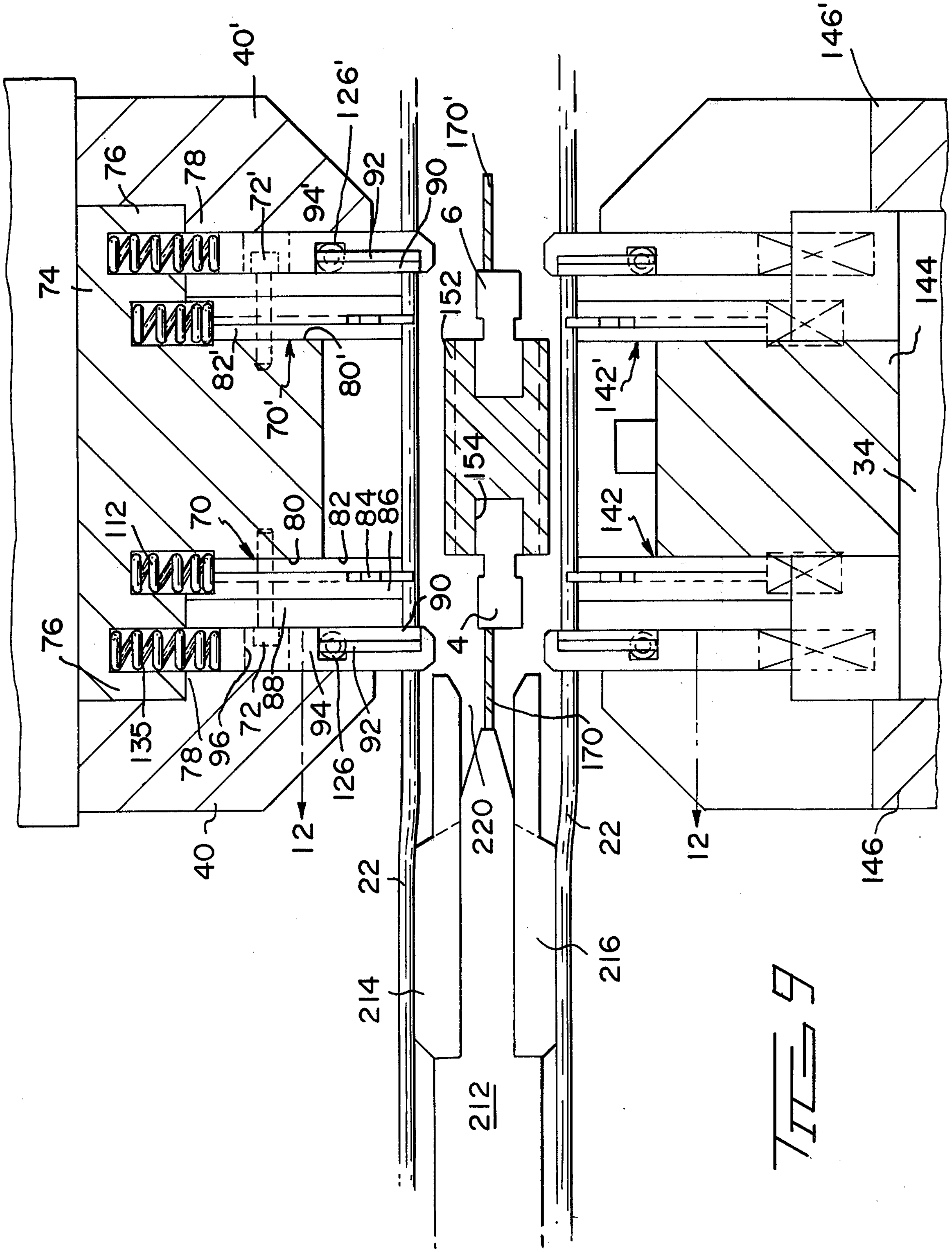
FIG. 9 is a fragmentary view on an enlarged scale and partially in section showing the insertion zone of the apparatus with the parts positioned preparatory to insertion of the wires into the connectors.

The connectors are lightly held in the slots 154 on the sides of the slide 152 by means of retaining fingers 170, 170' which are pivotly mounted at 172, 172' on the upper surface of the slide and which extend along each side of the slide, see FIGS. 9, 14 and 15. These retaining members extend beyond the outer end of the slide support, the right-hand end as viewed in FIG. 14, and are biased by means of springs 176 towards the sides of the slide; in other words, the retainers 170, 170' are resiliently biased to the position of FIG. 14 so that they bear against the connectors positioned in the slots 154, 154' as shown also in FIG. 16. However, and for reasons which will be explained below, it is important that the connectors should not be firmly clamped by the retaining fingers 170, 170' so that the slide 56 can move from the insertion zone, from the position of FIG. 15 to the position of FIG. 14, after the wires have been inserted without dragging the connectors 4, 6 laterally from the insertion zone. The connectors 4, 6 can be placed in the slots or channels 154 by grasping the right-hand ends 174, 174' of the retainers 170, 170' as viewed in FIG. 14 and moving these ends towards each other. The fingers will then be pivoted about their pivotal axes 172, 172' and the left-hand ends of the retainers will move away from the sides of the slide 152.

The springs 176 and the pivot pins 172, 172' are contained in a suitable housing or cover 178 which is supported on the slide support 156. This cover 178 has side portions which depend past the sides of the slide support 156 and which have inwardly turned ears 180 on their ends serving to retain the slide and the housing on the upper surface of the slide support, see FIG. 7.

A switch, 182 is mounted against the underside of the slide support 156 and has a switch arm 184 on the end of which there is provided a roller 186. This roller is engaged by a block 188 which is mounted in the slide. Block 188 depresse switch arm 184 when the slide is in the position of FIGS. 7 and 14. As will be explained below, switch 182 controls the functions of a piston cylinder 204 which advances the first connector from the insertion zone.

The slide 152 has a leading end 190 which is of reduced width as shown in FIG. 14 and which moves between the lower ends of the aligning blocks 140, 140' when the slide is in its inner position of FIG. 15. These aligning blocks in cooperation with the leading end 190 serve to align the slide 152 and the connectors 4, 6 held therein with the wires 22 prior to movement of the tooling 70, 70' towards the connectors. As best shown in FIG. 7, the leading end of the slide moves over a support member 194 and moves against a switch button 192 mounted in the neck portion of the press. Support member 194 is supported on a spring 195 in a manner such that it can be depressed when the slide 152 moves downwardly as described below. The condition of the switch from which switch button 192 extends must be changed before the operating cycle will be initiated.

The wires 22 extend from endless sources such as spools (not shown) to a first wire guide assembly 196, FIG. 1, which serves to locate the wires in spaced-apart approximately parallel planes. The wires are precisely located in spaced-apart planes by the wire positioning plates 94, 94' and the wire retainer members 90, 92, 90', 92' in the insertion zone.

The wire guide assembly 196, FIG. 1, comprises a rectangular frame 198 having vertically extending side members which are slidably supported in spaced-apart support members 200 mounted on the base plate. The frame 198 is resiliently biased upwardly by springs 208 and the frame is connected to the slide support 156 by a connecting arm 206 so that the frame 198 can move downwardly from the position shown in FIG. 1 when the slide support 156 moves downwardly.

The frame 198 has a centrally located plate 202 extending thereacross and a pneumatic piston cylinder 204 is mounted on this plate. The piston rod of this piston cylinder is connected to a horizontally extending wire guide plate 212, FIGS. 1 and 9, so that the guide plate can be moved into the insertion zone when the piston within the cylinder 204 is pressurized. The wires are guided between vertically extending rods 210 in the frame 198 and a light pressure is imposed on the wires by pressure bars 211.

Figure 10:
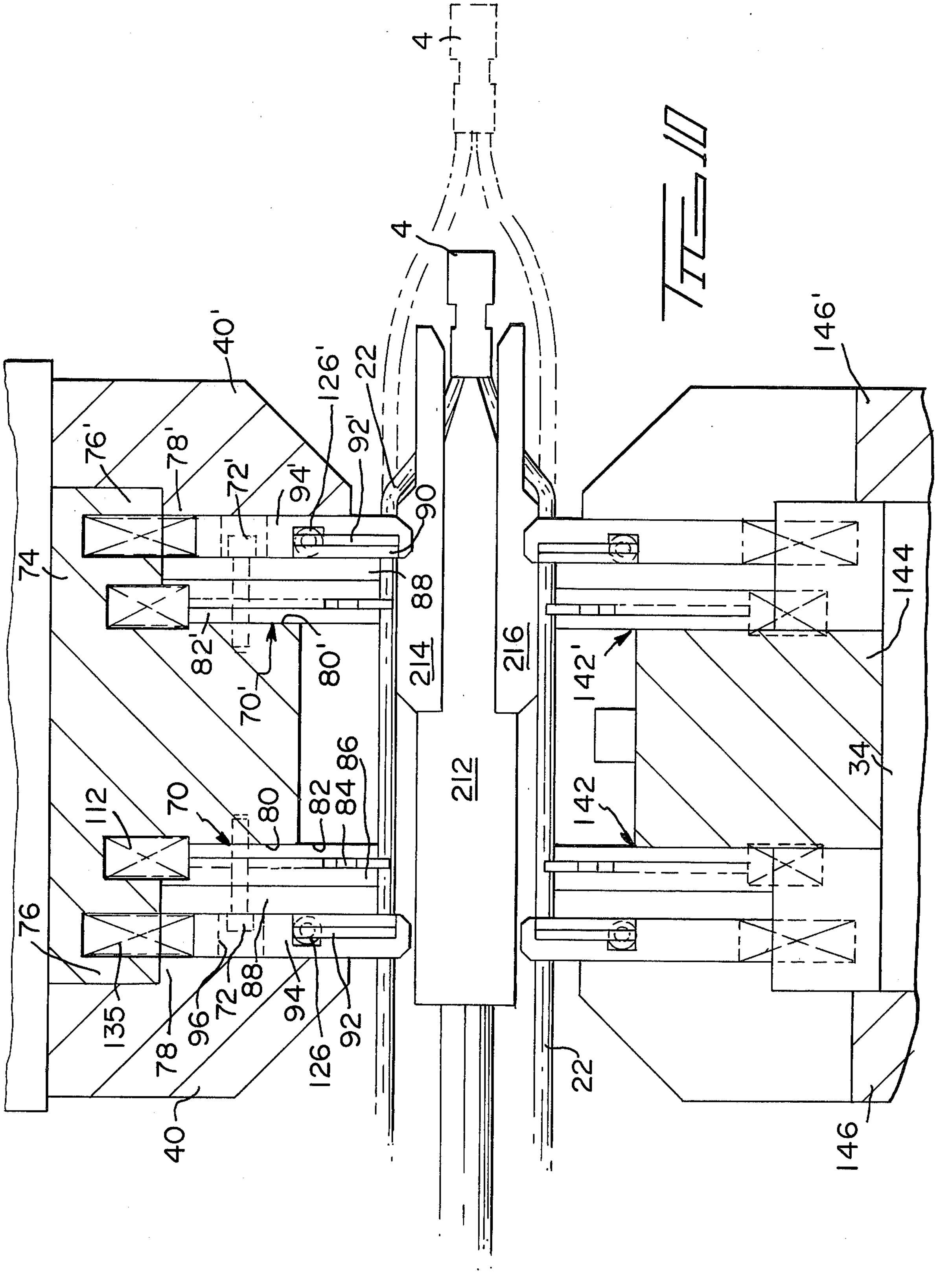
FIG. 10 is a view similar to FIG. 9 but showing the position of the parts after insertion of the wires and after the first connector has been fed through the insertion zone.

The wires extend across the upper and lower surfaces, as viewed in FIGS. 4 and 9, of the guide plate 212 and into spaced-apart grooves 218 in the surfaces of upper and lower wire locating plates 214, 216. These locating plates extend beyond the outer end of the guide plate 212 so that a pocket 220 is provided which is dimensioned to receive the mating end of a first connector 4 and carry the first connector through the insertion zone rightwardly as shown in FIGS. 9 and 10.

The method of producing harness assemblies has been previously described with reference to FIGS. 3–6. The operation of the apparatus in carrying out this method is as follows.

At the beginning of an operating cycle, the wires 22 will extend as shown in FIGS. 1 and 9 across the upper and lower surfaces of the guide plate 212 through the grooves in the upper and lower wire locating plates 214, 216 and through the insertion zone of the apparatus. The wires in the upper plane of wires will be precisely located in the insertion zone by means of the locaters 94, 94', by the wire retainers, 90, 92 and by the wire separators 84. The wires in the lower plane of wires will be similarly located by the lower tooling. Also, at the beginning of an operating cycle, the slide 152 will be in its inner position shown in FIG. 14 and will hold one or more first and second connectors 4, 6, in the recesses 154, 154'. The wires will extend rightwardly in FIG. 9 beyond the operating zone and will have a first connector 4 on their ends which was installed during the previous cycle.

When compressed air is supplied to the cylinder 62 by engaging a suitable control such as a foot switch, compressed fluid is supplied to the cylinder 52 and the ram assembly 38 is moved downwardly towards the lower tooling of the apparatus. As the upper tooling 70, 70' approaches the connectors 4, 6, the wires 22 in the upper plane are cut by the edges 157 of the slide 152 in cooperation with the cutting edges 97 of the cutting members 82. Also, the the slide member 152 is pushed downwardly to bring the downwardly facing sides of the connectors into engagement with the lower tooling assemblies 142, 142' of the first and second stations. The wires extending beneath the connectors are similarly cut and the wires are then inserted into the terminals by the inserters when the ram assembly 38 reaches the limit of its downward movement The ram assembly is then returned to its raised position by relieving the pressure of the hydraulic fluid in the cyclinder 52 and the slide 152 is manually withdrawn from the insertion zone; that is the slide is moved from the position of FIG. 15 to the position of FIG. 14. However, since the wires 22 are now connected to the terminals in the connectors 4, 6, the connectors do not travel with the slide and the fingers 170, 170' slide over the surfaces of the connector. A finished harness subassembly comprising a recently installed second connector 6 and a previously installed first connector 4 (on the ends of the wires extending rightwardly from the connector 6 shown in FIG. 10) is removed from the machine leaving the first connector 4 in the insertion zone. The piston cylinder 204 is now pressurezed causing the wire guide plate 212 to move rightwardly from the position of FIG. 9 to the position of FIG. 10. During such movement, the connector is received in the pocket 220 and the connector is carried rightwardly to the position of FIG. 10 pulling with it wire from the endless sources for each wire 22. The operator can then grasp the first connector 4 and pull it a further distance rightwardly until, as illustrated by the phantom lines in FIG. 10, he has withdrawn the desired amount of wire from the spools. The wires meantime are being guided by the guide means 196 and are being guided in the insertion zone by the inserting tooling; the wires during this interval are maintained in the wire retainers shown in FIG. 12 by virtue of the restricted openings 133 in these retainers. The operator next loads the slide with a first and a second connector by positioning these connectors in the recesses 154, 154'. The slide is then moved to the position of FIG. 15 and the entire cycle is repeated.

As previously mentioned, a suitable foot controlled switch may be provided to actuate the control circuit for the apparatus to cause it to go through a complete operating cycle. The control circuit should be such that the switch button 192 is held in a depressed condition by the leading end 190 of the slide 152 before the cylinder 62 is pressurized. The switch from which the switch button 192 extends thus serves to ensure that the ram assembly 38 will not be moved downwardly until the slide is moved completely to its inner position, FIG. 15, and the connectors carried by the slide are properly positioned relative to the wires. The switch button 192 thus ensures that the tooling will not be damaged by its being lowered when the slide is not fully inserted. Also, the switch arm 184 must be depressed before the cylinder 204 is pressurized and this switch arm is depressed when the slide is moved to its fully retracted position by the block 188. The switch 182 thus serves to ensure that the apparatus will not be jammed or damaged by premature movement of the plate 122 into the insertion zone. Control circuits for the apparatus can thus be produced with a variety of known electrical switches and valves.

The practice of the invention permits the achievement of several advances in the art of harness manufacturing and the manufacture of harness sub-assemblies. As mentioned previously, the present invention permits the extension of the inventions disclosed in U.S. Pat. Nos. 3,866,297 and 3,909,935 to the manufacture of harness assemblies having two row connectors thereon rather than single row connectors. The present inventron is not limited however to practice with two row connectors but can be practiced with single row connectors and the advantages of automatic or semiautomatic loading of the connectors and automatic or semiautomatic feeding of the wired first connector are achieved. A wide variety of types of apparatus can be used in the practice of the invention, the particular apparatus for a particular usage being determined by the nature of the manufacturing operation being carried out.

In the foregoing description, it has been assumed that the harness sub-assembly shown in FIG. 2 will consist of one first connector 4 and one second connector 6 and the drawing shows in FIG. 2 an eight position connector for each end of the conductor array. It will be understood that many types of harnesses or harness subassemblies can, however, be produced. A plurality of connectors can be positioned in each of the insertion stations during each operating cycle of the apparatus to produce a wide variety of harness subassemblies. For example, FIG. 17 shows a harness comprising a relatively long connector 228 with the wires extending from this connector a plurality of smaller connectors 230. By way of example, the connector 228 may have forty terminals therein arranged in two rows of twenty terminals each and each of the connectors 230 can have .eight terminals therein.

It will be noted in FIG. 17 that the wires extending between the individual connectors 230 and the forty-position connector 228 are of varying lengths and are of uniform lengths for each of the connectors 230. A harness of this type is frequently used when for example, it is desired to provide connections between a junction box and a plurality of components or other devices which are at varying distances from the junction box. The harness shown in FIG. 17 can be produced by the method and with the apparatus of the present invention in the following manner.

A plurality of the eight-position connectors 230 are positioned in the first insertion station 224 and a single connector 228 is positioned in a second insertion station 224' at the beginning of the operating cycle. After wires have been connected to all of these connectors, a harness as shown in FIG. 17, will be produced. The individual connectors 230 are fed or advanced from the first insertion station through the apparatus and beyond the insertion zone, however, they are advanced by varying amounts to produce wires 22 in the finished harness of the desired lengths. The cycle is then repeated by placing a single connector 228 in the first insertion station and a plurality of connectors 230 in the second insertion station.

What is claimed is:

1. A method of serially manufacturing electrical harness assemblies of the type comprising a first and second electrical connector, each of said connectors having two parallel rows of contact terminals therein, each of said terminals having a wire-receiving portion, said wire-receiving portions of said two rows facing in opposite directions, and wires extending between said connectors, the ends of said wires being received in said wire-receiving portions of said terminals in said first and second connectors, said method comprising the steps of:

(1) feeding wires extending from endless sources along a feed path in two parallel spaced-apart planes which feed path extends through and beyond an insertion zone with the wires in each plane being spaced apart by distances equal to the distance between adjacent wire-receiving portions of terminals in the rows of terminals in said connectors, (2) positioning a first and a second connector in said insertion zone between said planes with the wire-receiving portions of said terminals in said first and second connectors in alignment with each other and in alignment with the wires in said two planes and with said second connector being downstream, relative to the direction of wire feed along said path, from said first connector, (3) moving said wires in said two planes laterally of their axes, towards said connectors and into said wire-receiving portions of said terminals and severing said wires at locations between said first and second connectors, (4) removing the second connector with wires extending beyond said insertion zone, (5) moving said first connector along said path completely through, and for a predetermined distance beyond, said insertion zone and thereby feeding wire from said sources along said feed path towards said insertion zone, maintaining said wires in said two planes during feeding of said wires, and repetitively carrying out steps (2), (3), (4), and (5) to produce said harness assemblies serially.

2. A method as set forth in claim 1 in which each of said wires is severed adjacent to said wire-receiving portion of each of the terminals into which said wire is moved.

3. A method as set forth in claim 2 in which said first connector is moved along said feed path through and beyond said insertion zone by pushing said first connector.

4. Apparatus for serially manufacturing harness assemblies of the type comprising a first and second electrical connector, each of said connectors having at least one row of contact terminals therein, each of said terminals having a wire-receiving portion, and wires extending between said connectors, the ends of said wires being received in said wire-receiving portions of said terminals in said first and second connectors, said apparatus comprising:

an insertion zone having first and second side-by-side adjacent insertion stations therein, first and second connector locating means at said first and second insertion stations for locating a first connector and a second connector at said stations in parallel aligned relationship with said wire-receiving portions of said terminals in said first and second connectors in alignment, wire positioning and retaining means in said insertion zone, said wire positioning and retaining means being effective to locate a plurality of wires in a common plane with the axes of said wires in alignment with said wire-receiving portions of said terminals in said first and second connectors in said first and second connector locating means, said wire positioning and retaining means being effective releasably to retain said wires until said wires are moved towards said first and second connector locating means, wire guide means for guiding wires which extend from substantially endless sources of wire to said wire positioning and retaining means, first and second insertion tooling means, each of said insertion tooling means comprising inserters which are normally spaced from said first and second locating means, said inserters being movable relatively towards said connector locating means and being effective during movement to move wires from said positioning and retaining means towards said connector locating means and into said wire receiving portions of said terminals, and, severing means in said insertion zone between said first and second insertion tooling means for severing said wires at locations between said connector locating means whereby, said harness assemblies are produced serially by feeding wires extending from the endless sources of wire along a wire feed path which extends through said guide means to said insertion zone, locating said wires in said wire positioning and retaining means, placing connectors in said locating means in said first and second insertion. stations, moving said inserters towards said connectors, severing said wires by means of said severing means, removing said second connector from said apparatus, moving said first connector and the wires connected thereto through and beyond said insertion zone and thereby withdrawing wire from said endless sources of wire, and repeating the foregoing steps.

5. Apparatus as set forth in claim 4, said severing means comprising first and second severing blade means proximate to said first and second insertion tooling means and between said first and second insertion tooling means.

6. Apparatus as set forth in either of claims 4 or 5 having connector moving means for moving said first connector through said insertion zone.

7. Apparatus as set forth in claim 6, said moving means comprising pushing means normally disposed beside and upstream, relative to said wire feed path, from said insertion zone, said pushing means being movable parallel to said wire feed path into said insertion zone and against said first connector, said pushing means being effective to push said first connector through said insertion zone.

8. Apparatus as set forth in claim 7, said pushing means comprising plate means disposed in a plane which is parallel to said common plane.

9. Apparatus as set forth in claim 8 said wire guide means comprising spaced-apart wire separator means on said plate means.

10. Apparatus as set forth in claim 4 having connector loading means for loading a first connector and a second connector in said first and second connector locating means.

11. Apparatus for serially manufacturing harness assemblies of the type comprising first and second electrical connectors, each of said connectors having two parallel rows of contact terminals therein, each of said terminals having a wire-receiving portion, said wire-receiving portions of said two rows facing in opposite lateral directions relative to the axis of the connector, and wires extending between said connectors, the ends of said wires being received in said wire-receiving portions of said terminals in said first and second connectors, said apparatus comprising:

an insertion zone having first and second side-by-side adjacent insertion stations therein, first and second connector locating means at said first and second insertion stations for locating a first connector and a second connector at said stations in opposed parallel aligned relationship with said wire-receiving portions of said terminals in said first and second connectors in alignment, wire positioning and retaining means in said insertion zone, said wire positioning and retaining means being effective to locate a plurality of wires in two spaced-apart parallel planes, said first and second connector locating means being between said planes, the axes of the wires in said planes being in alignment with said wire receiving portions of said terminals in first and second connectors in said first and second connector locating means, said wire positioning and retaining means being effective releasably to retain wires until said wires are moved towards said first and second connector locating means, first and second sets of insertion tooling means, each of said sets comprising a pair of opposed normally spaced-apart inserters, said inserters being normally spaced from said connector locating means, said inserters of each set being movable relatively towards said connector locating means and being effective during movement to move wires from said wire positioning and retaining means towards said connector locating means and into said wire receiving portions of said terminals, and severing means in said insertion zone between said sets of insertion tooling means for severing said wires at locations between said connector locating means, whereby, said harness assemblies are produced serially by the steps of feeding wires extending from endless sources of wire along a wire feed path which extends through and beyond said insertion zone, locating said wires in said wire positioning and retaining means, placing connectors in said connector locating means in said first and second insertion stations, moving said inserters of each of said sets towards each other, severing said wires by means of said severing means, removing said second connector from said apparatus, moving said first connector through and beyond said insertion zone and thereby withdrawing wire from said endless sources of wire and repeating the foregoing steps.

12. Apparatus as set forth in claim 11, said severing means comprising first and second severing blade means between said first and second sets of insertion tooling means.

13. Apparatus as set forth in either of claims 11 or 12 having connector moving means for moving said first connector through said insertion zone.

14. Apparatus as set forth in claim 13, said moving means comprising pushing means normally disposed beside and upstream, relative to said wire feed path, from said insertion zone, said pushing means being movable parallel to said wire feed path, into said insertion zone and against said first connector, said pushing means being effective to push said first connector through said insertion zone.

15. Apparatus as set forth in claim 14, said pushing means comprising plate means disposed in a plane which is between said two planes.

16. Apparatus as set forth in claim 15 having wire guide means for guiding wires from said substantially endless sources to said wire positioning and retaining means during movement of said first connector and the wires attached thereto through and beyond said insertion zone under the influence of said pushing means.

17. Apparatus as set forth in claim 16, said wire guide means comprising spaced-apart wire separator means on said plate means.

18. Apparatus as set forth in claim 13 having wire guide means for guiding wires from said substantially endless sources to said wire positioning and retaining means during movement of said first connector and the wires attached thereto through and beyond said insertion zone.

19. Apparatus as set forth in claim 12, having connector loading means for loading a first connector and a second connector in said first and second connector locating means.

20. Apparatus as set forth in claim 19, said loading means comprising a slide member movable along a loading slide path which extends transversely of said wire feed path and into said insertion zone.

21. Apparatus as set forth in claim 20, said slide member having a portion which is disposed in said insertion zone and between said spaced-apart parallel planes when said slide is at a limit of its movement in one direction along said loading slide path, said first and second connector locating means being on said portion of said slide member.

* * * * *